March 20, 1928.  1,663,414
A. H. MIZE
VARIABLE SPEED PULLEY
Filed Sept. 10, 1926  4 Sheets-Sheet 1
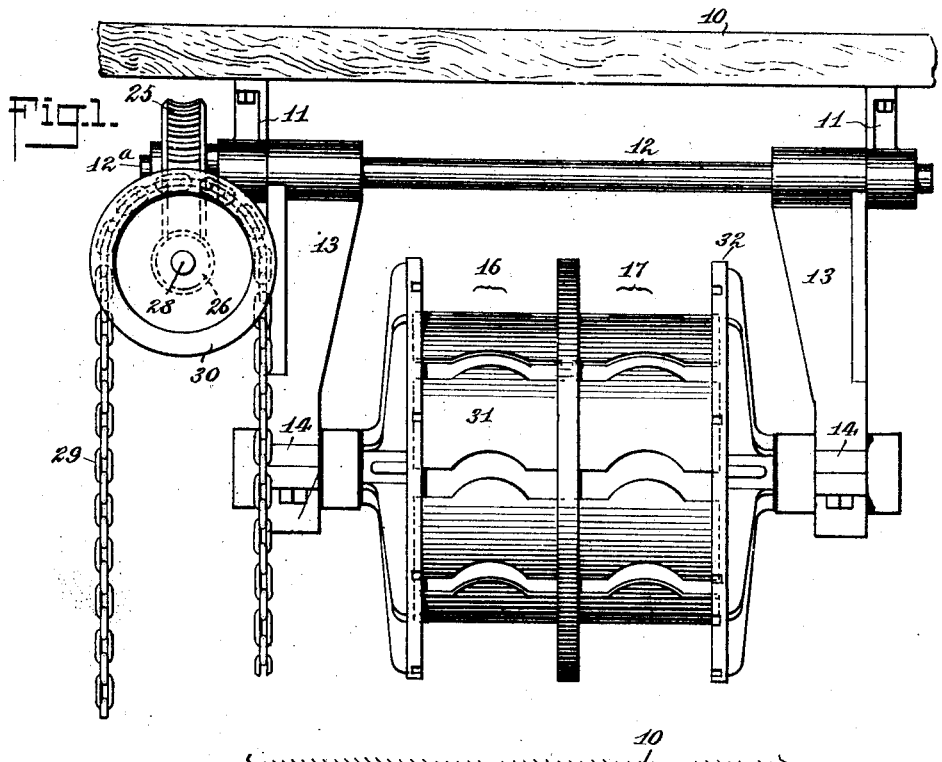
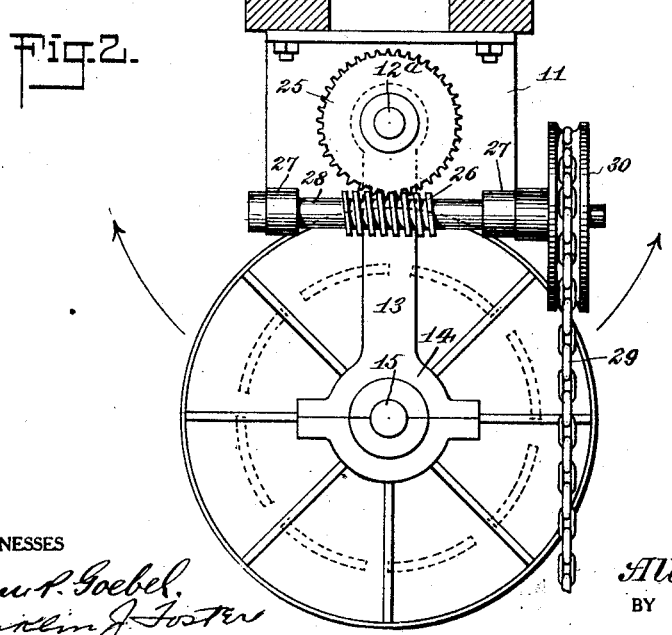
WITNESSES
INVENTOR
Albert H. Mize
BY
ATTORNEYS March 20, 1928.
A. H. MIZE
1,663,414
VARIABLE SPEED PULLEY
Filed Sept. 10, 1926
4 Sheets-Sheet 2
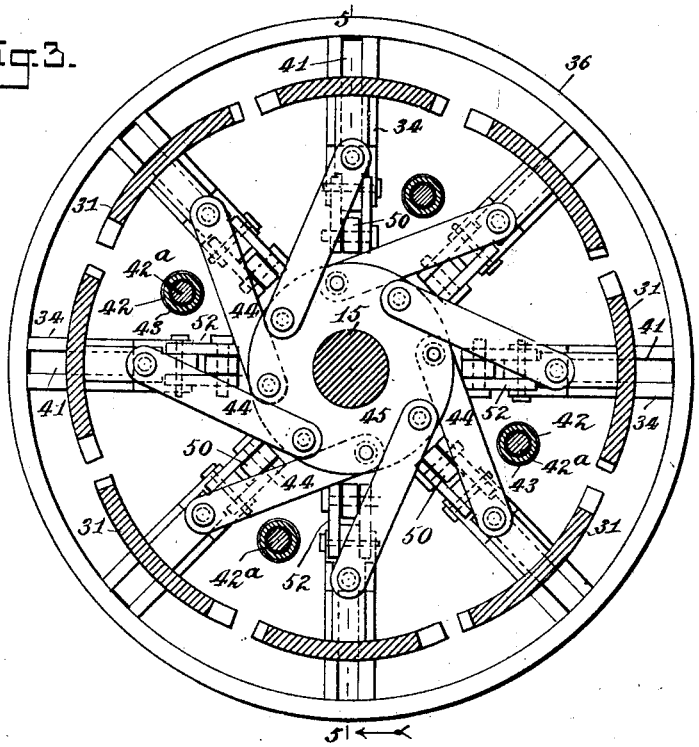
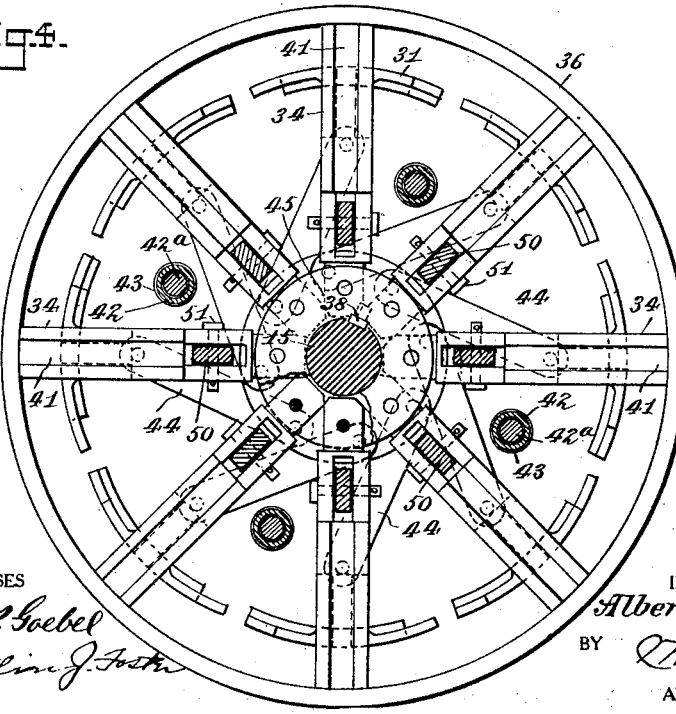
WITNESSES
William P. Goebel
Franklin J. Foster
INVENTOR
Albert H. Mize.
BY
Munn & Co
ATTORNEYS March 20, 1928.
A. H. MIZE
1,663,414
VARIABLE SPEED PULLEY
Filed Sept. 10. 1926
4 Sheets-Sheet 3
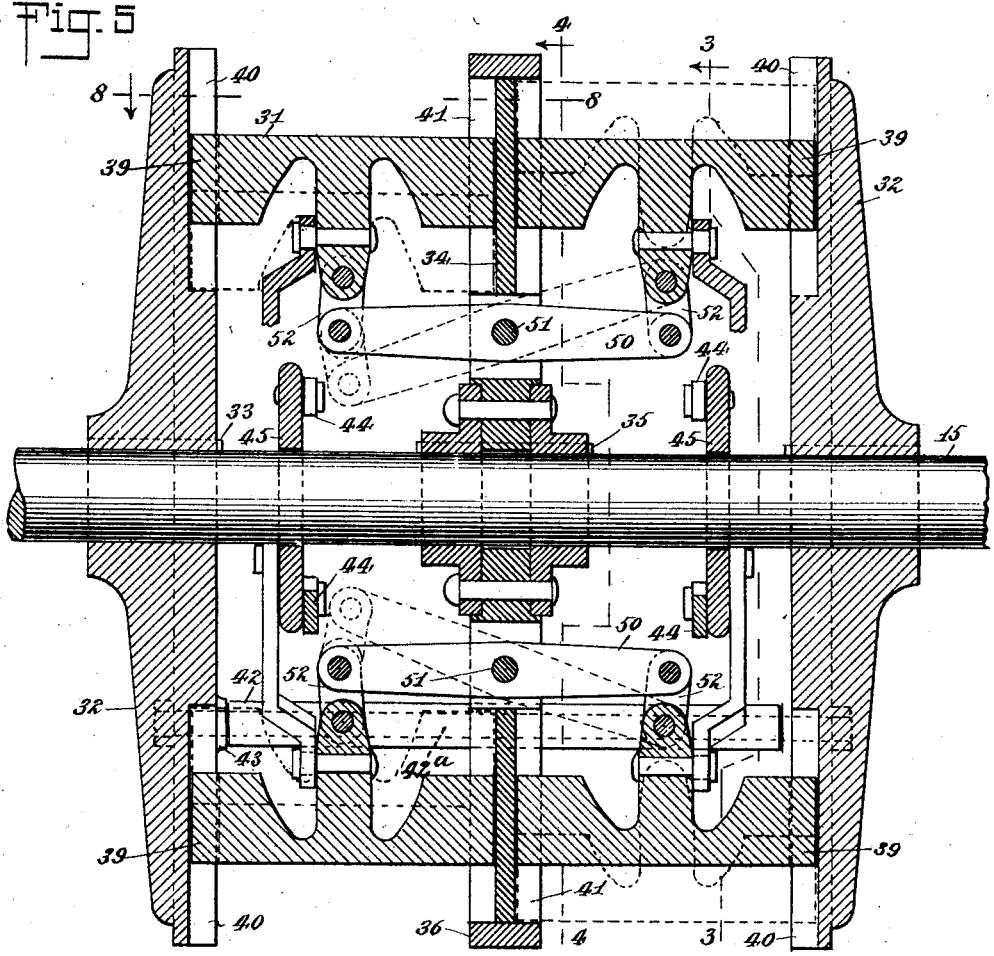
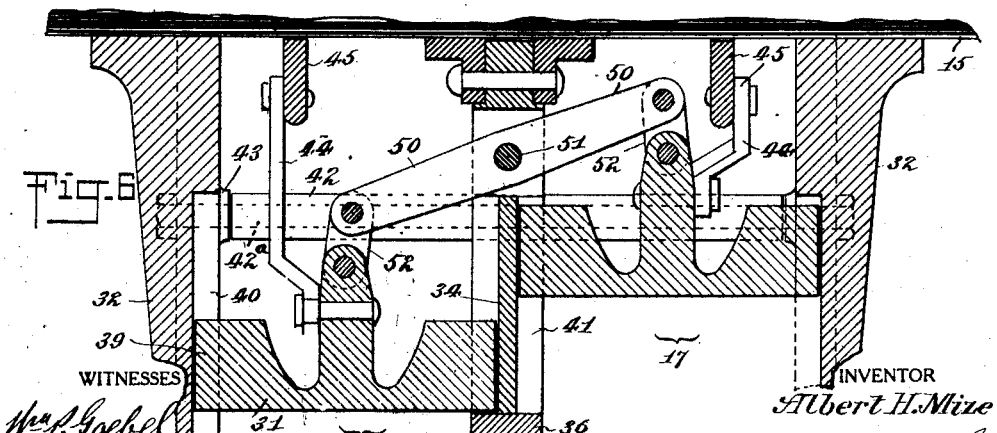

March 20, 1928.
A. H. MIZE
1,663,414
VARIABLE SPEED PULLEY
Filed Sept. 10. 1926
4 Sheets-Sheet 4
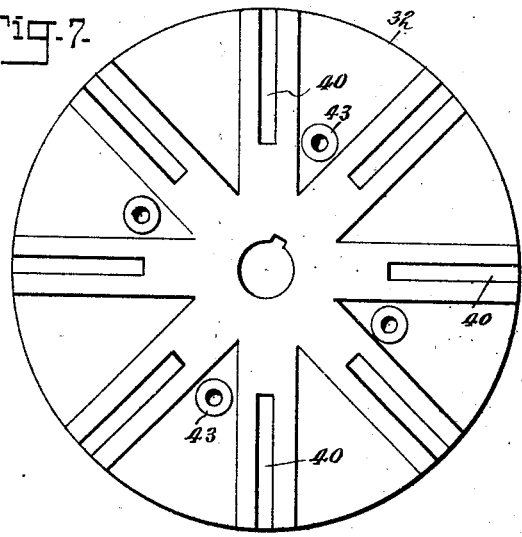
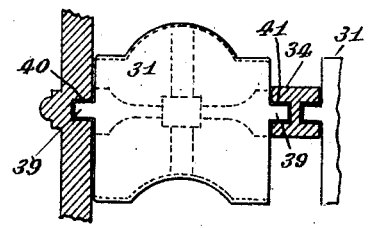
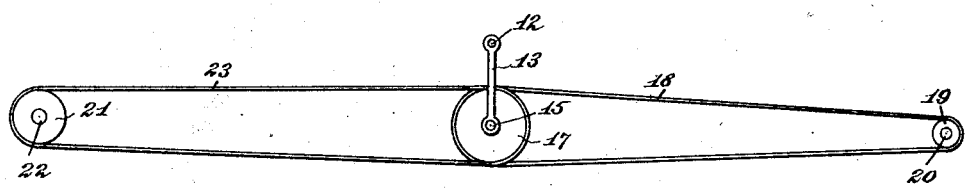
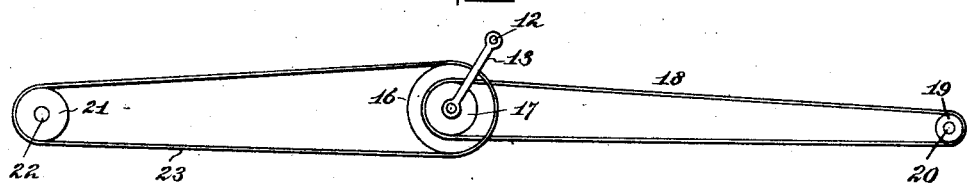
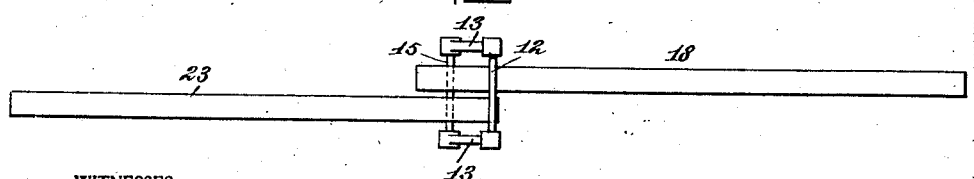
WITNESSES
William A. Goebel
Franklin J. Foster
INVENTOR
Albert H. Mize
BY
Munn & Co.
ATTORNEYS Patented Mar. 20, 1928.

1,663,414

UNITED STATES PATENT OFFICE.

ALBERT HORACE MIZE, OF GREENVILLE, SOUTH CAROLINA.

VARIABLE-SPEED PULLEY.

Application filed September 10, 1926. Serial No. 134,727.

The present invention is concerned with the provisions of improvements in variable speed pulleys of the character employed for changing the speed ratio between a driving shaft and a driven shaft where the drive is effected through the intermediacy of belts.

The prime object of the present invention is to provide a pulley of this character so constructed that there will be no parts of the pulley in motion relative to each other except at the time that the diameter of the pulley is being changed.

A further object of the invention is to provide an adjustable speed pulley which includes a pair of pulleys formed of radially adjustable segments and so constructed that the contraction or reduction of diameter of one pulley automatically effects the expansion of the other pulley.

Preferably the pulley structure is mounted upon a pivoted hanger frame, one pulley being connected by a belt to the drive shaft and the other pulley being connected by a belt to the driven shaft. Means is provided for swinging the frame thereby automatically tightening one belt about its pulley and loosening the other belt on its pulley. The tightening of the belt in itself effects contraction of the pulley with which it is associated and causes expansion of the other pulley to take up the slack in its belt.

Other and more general objects of the invention are to provide a variable speed pulley of simple, practical construction, which will be rugged, durable and efficient in use, which is well suited to the requirements of economical manufacture, and capable of adjustment with comparative ease and expedition.

With the above-noted and other objects in view, the invention consists in certain novel features of construction and combinations and arrangements of parts, as will be more fully hereinafter described.

The invention may be better understood from the following description in connection with the accompanying drawings, wherein Figure 1 is a view in front elevation of a pulley embodying the invention;

Fig. 2 is a view in side elevation of Fig. 1;

Figs. 3 and 4 are vertical sectional views through the pulley taken on the staggered lines 3—3 and 4—4, respectively, of Fig. 5;

Fig. 5 is a longitudinal sectional view through the pulley on approximately the line 5—5 of Fig. 3;

Fig. 6 is a fragmentary sectional detail also on the line 5—5 of Fig. 3, but showing the position of the parts when one pulley has been contracted and the other expanded;

Fig. 7 is an inside face view of one of the heads;

Fig. 8 is a fragmentary sectional detail on the line 8—8 of Fig. 5;

Fig. 9 is a diagrammatic view in side elevation showing the pulley in use between a driven shaft and a drive shaft and the two pulley sections adjusted so that they are of the same diameter;

Fig. 10 is a similar view but showing one section contracted and the other expanded to effect reduction of the speed of the driven shaft;

Fig. 11 is a top plan view of the diagrammatical showing of Fig. 10.

In Figs. 1 and 2 of the drawings I have used the reference character 10 to designate an overhead support of any suitable nature from which depend a pair of bearing brackets 11 journaling a horizontal shaft 12. Rigid with and depending from the shaft 12 are hangers 13 provided at their lower ends with sectional bearings 14 in which a shaft 15 is borne.

It is upon the shaft 15 that the pulley, or, as a matter of fact, the two pulleys or pulley sections designated generally by the numerals 16 and 17, are rotatable. As seen in Figs. 9 to 11, one of the pulleys, such as 17, is adapted to be connected by a belt 18, to a pulley 19 on a driven shaft 20. The other pulley, 16, is connected to a pulley 21 on a driving shaft 22, through the intermediacy of a belt 23. The shaft 15 thus serves in effect, as a countershaft carrying the variable speed pulleys 16 and 17. The pulleys are so constructed that when the hangers 13 are swung with the supporting shaft 12 from the position of Fig. 9 to the position of Fig. 10, the pulley 17 will be contracted by the pressure of its belt 18 and pulley 16 will be automatically expanded in a manner to be later described, to take up the slack in its belt 23.

Means are provided for rocking the shaft 12 to effect swinging of the hangers 13 and the shaft 15 which they carry. This means has been illustrated as a worm gear 25 fixed to the projecting end 12$^a$ of the shaft 12, The gear 25 meshes with a screw 26 on a shaft 28 journaled in bearings 27 integral with one of the brackets 11. Motion is imparted to the shaft 28 through a sprocket chain 29 running over a sprocket wheel 30 carried by the shaft 28. Obviously, rotation of the sprocket wheel acts through the screw and worm to swing the shaft 15 about the shaft 12 as a center.

Each of the pulleys 16 and 17 is formed of a plurality of radially adjustable sections or segments 31 adapted to snugly interfit and form a closed drum when they are fully contracted. The outer heads of the drums are defined by disks 32 keyed to the shaft 15, as indicated at 33, and the drums have a common inner head defined by a spider 34 keyed at 35 to the shaft 15 and formed with a peripheral rim 36. The rim 36 and the edges of the disk 32 provide flanges which prevent lateral slipping of the belts which run over the pulley drums 16 and 17. Relative separation of the heads 32 is prevented by spacer sleeves 42 and tie bars 42ᵃ.

Each of the segments 31, as best seen in Figs. 1 and 8, is formed with laterally projecting lugs 39 working in guide grooves 40 and 41 in its disk 32 and the spider 34 respectively. Radial inward and outward movements of the segments 31 in a straight line is thus insured.

In order that all of the segments of each drum may move simultaneously inwardly or outwardly, I connect all of the segments through control links 44 to a central control disk 45 turning freely on the shaft 15. The control links 44 are disposed at angles to the radii of the drums so that pressure on any drum segment which tended to move the same inwardly in its guides 40, 41, would act through an associated link 44 to rotate disk 45 and draw all of the other segments inwardly by the action of their drag links. Means is provided whereby the contraction of one segmental pulley drum automatically effects the simultaneous expansion of the other segmental pulley drum. This means may conveniently comprise a series of rocker arms 50 fulcrumed intermediate their ends on pins 51 carried by the spiders. The ends of the rocker arms project into the interiors of the drums and are connected directly to the segments by short pivot links 52. As best seen in Figs. 5 and 6, when one drum segment 31 of the drum 17 is forced inwardly, an associated rocker arm 50 is shifted from the position of Fig. 5 to the position of Fig. 6, and a corresponding segment 31 of the drum 16 is forced outwardly. The laterally alined segments of each drum are connected by rocker arms so that a maximum leverage is obtained to expand one drum as the other drum is contracted.

The operation of the device may best be followed from the diagram of Figs. 9 to 11. In Fig. 9 the drums are of equal size and it will be apparent that if the belts 23 and 18 are tightly stretched, movement of the shaft 15 to the left could not be accomplished without contraction of the drum 17. Thus as the sprocket chain is operated to swing the hangers 13, the pressure of the belt 18 on the drum 17 acts through the intermediacy of the drag links and control disks to force all of the segments of this drum inwardly. It will also be evident that as the hangers 13 move from the position of Fig. 9 to the position of Fig. 10, slack will be created in the belt 23. This slack is automatically taken care of, however, by the expansion of the pulley drum 16 as the drum 17 is contracted by the action of its belt.

From the foregoing description, it will be evident that a wide range of speed ratios may be obtained between the driving shaft 22 and the driven shaft 20 by the simple expedient of rocking the shaft 12 and swinging the hangers 13. Quite evidently the details of construction of the mechanism which effects movement of the pulley drum segments, as well as the mechanism which is used to effect rocking of the shaft 12, might be considerably varied. In fact, numerous changes and alterations might be made in the construction of the device without departing from the spirit or scope of the appended claims.

What is claimed is:

1. In combination a pair of segmental expansible and contractible pulleys, means for pivotally supporting the same, an element rotatable with each pulley, and operative connections between said elements and pulleys whereby said elements are rotated relative to the pulleys in reverse directions to contract one pulley and expand the other simultaneously upon tensioning one of the drive belts with which the pulleys are engaged.

2. In combination a laterally adjustable shaft, segmental expansible and contractible pulleys mounted thereon, normally stationary discs loose on the shaft, operative connections between each disc and segments of one pulley whereby one disc is rotated to contract one pulley upon tensioning its belt and thereby rotates the other disc in a reverse direction to expand the other pulley.

3. A variable speed pulley including a pair of segmental radially expansible and contractible pulley drums to be engaged by drive belts, a laterally movable shaft upon which the drums are mounted, discs loosely received on the shaft, normally tangentially disposed links connecting each disc and one of the segmental pulley drums, a collar loose on the shaft, and a plurality of levers pivotally mounted intermediate their ends and having their opposite ends pivotally connected with the segmental drums whereby upon lateral movement of the shaft a drive belt engaging one pulley will be tensioned to contract the former pulley and expand the other.

4. In combination a laterally movable support, a pair of pulleys rotatable thereon in longitudinal alignment and each including a plurality of radially movable segments, an annulus loose on the shaft within each set of segments, tangentially disposed links pivotally connected to each annulus and corresponding segments, a plurality of links pivotally supported intermediate their ends within the pulleys and having their ends pivotally connected with adjacent segments, whereby upon contraction of one set of segments incident to tensioning of a belt engaged therewith by lateral movement of the support the other set will be expanded.

5. A variable speed pulley including a pair of segmental radially expansible and contractible pulley drums adapted for the reception of belts from a drive shaft and a driven shaft, respectively, a carriage on which the drums are borne, means for shifting the position of the carriage relative to the shafts to which the belts are connected, means whereby a contraction of one drum caused by its belt as an incident of such shifting, automatically effects expansion of the other drum to take up the slack in its belt, central control disks housed within each drum and freely rotatable on the drum shaft, and drag links disposed at an angle to the radii of the drums, connecting the segments and control disks.

ALBERT HORACE MIZE.